Figure 25:
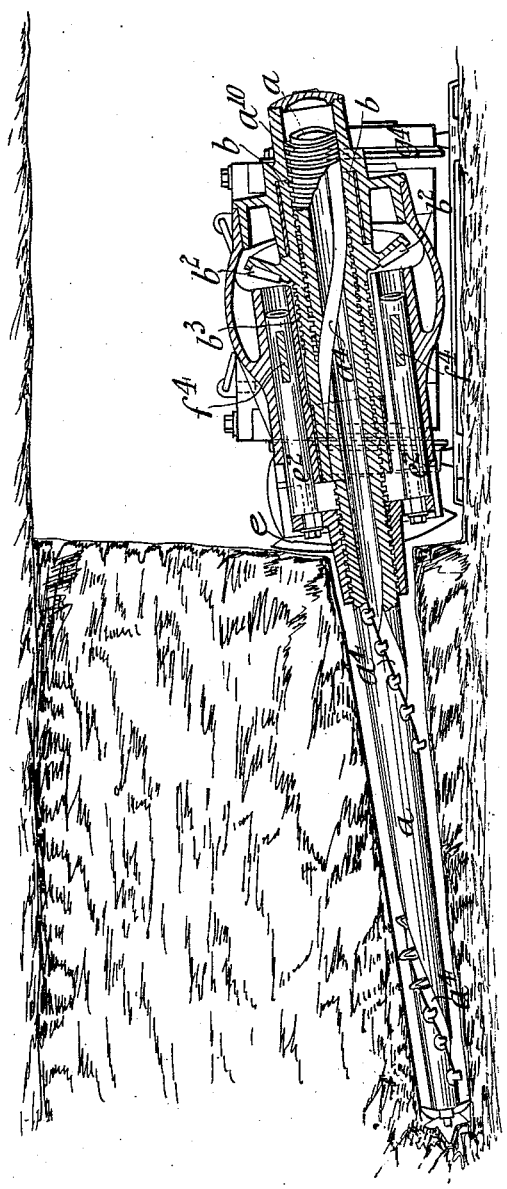

(No Model.)  12 Sheets—Sheet 1.
F. HURD.
COAL CUTTING OR LIKE MACHINE.
No. 556,986. Patented Mar. 24, 1896.
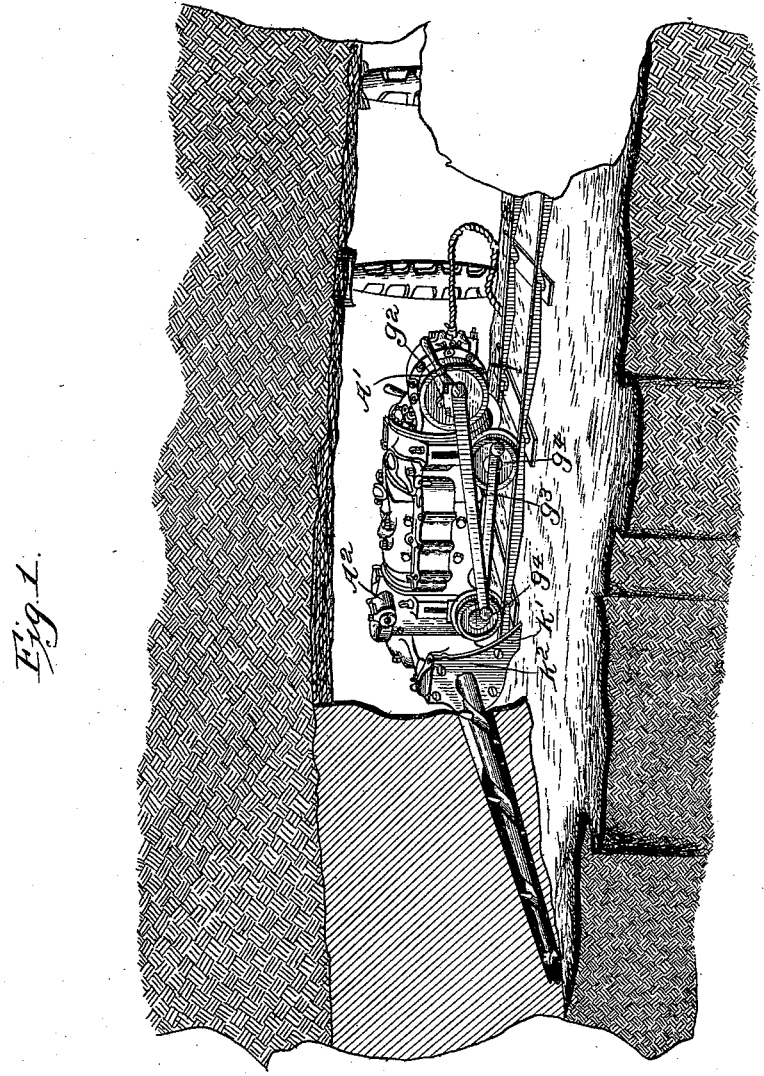
Witnesses:
Herbert Bradley
Geo. E. Cronse
Inventor
Frederick Hurd.
By Knight Bros
Attorneys.

(No Model.)  12 Sheets—Sheet 2.
F. HURD.
COAL CUTTING OR LIKE MACHINE.
No. 556,986.  Patented Mar. 24, 1896.
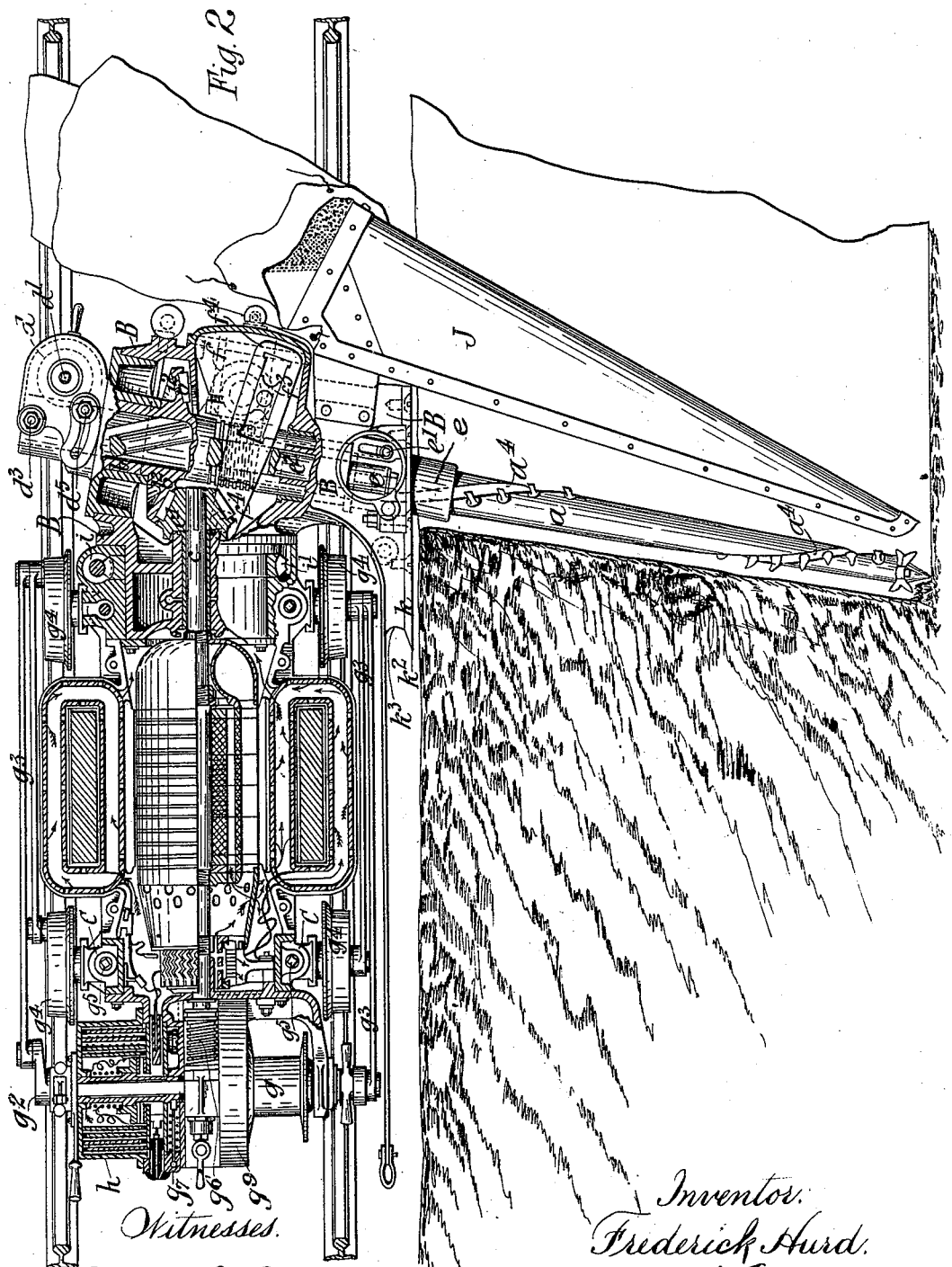
Witnesses.
Walter E. Allen.
Geo. E. Cruse.
Inventor.
Frederick Hurd.
By Knight Bros.
Attorneys

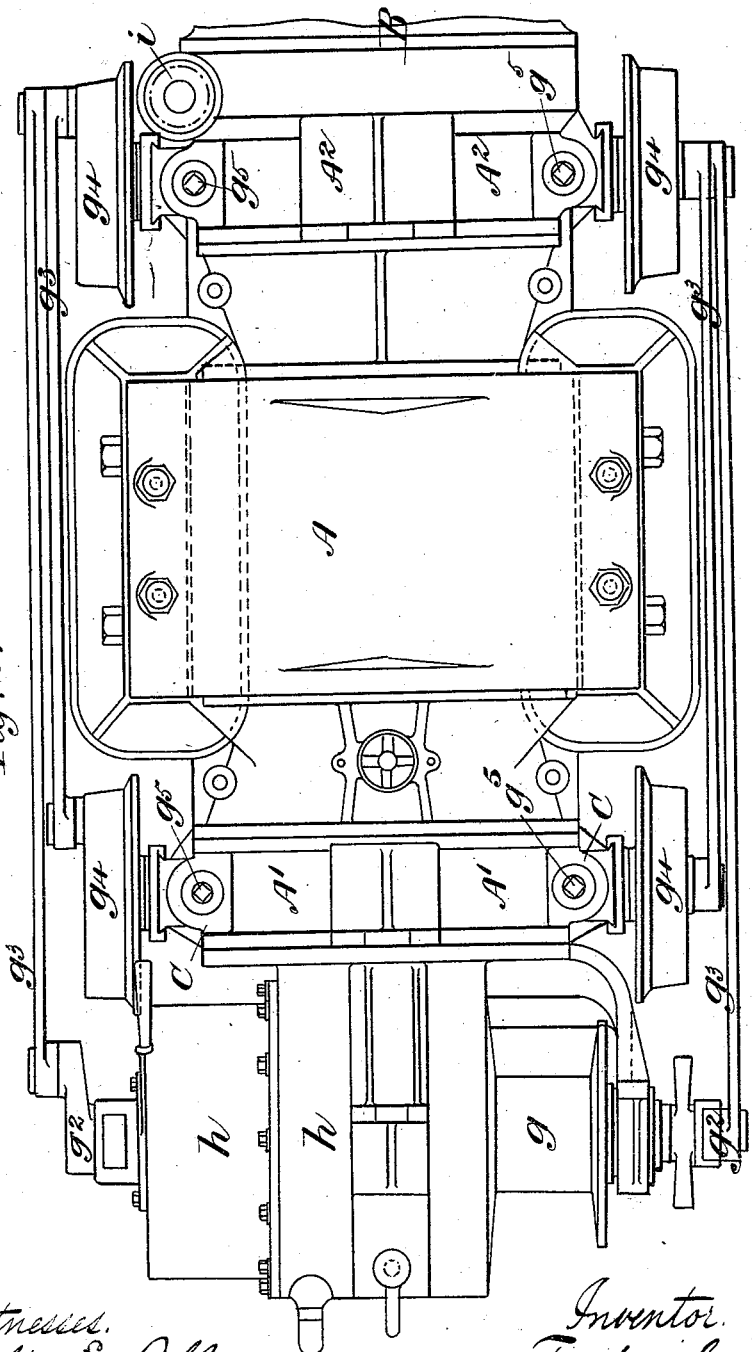

(No Model.)  12 Sheets—Sheet 4.
F. HURD.
COAL CUTTING OR LIKE MACHINE.
No. 556,986.  Patented Mar. 24, 1896.
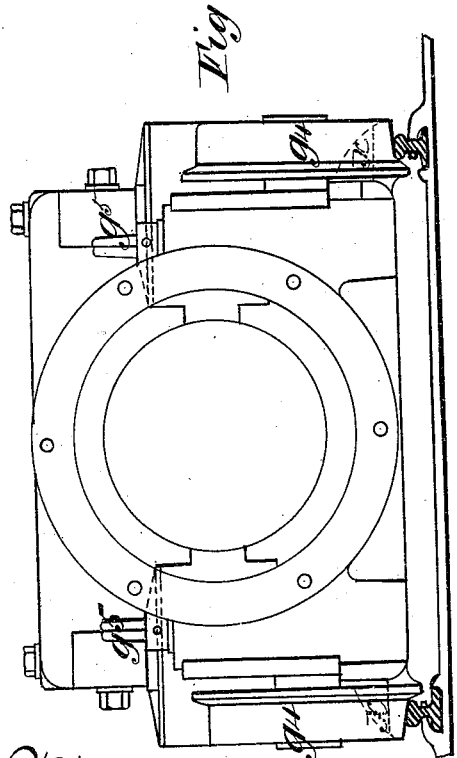
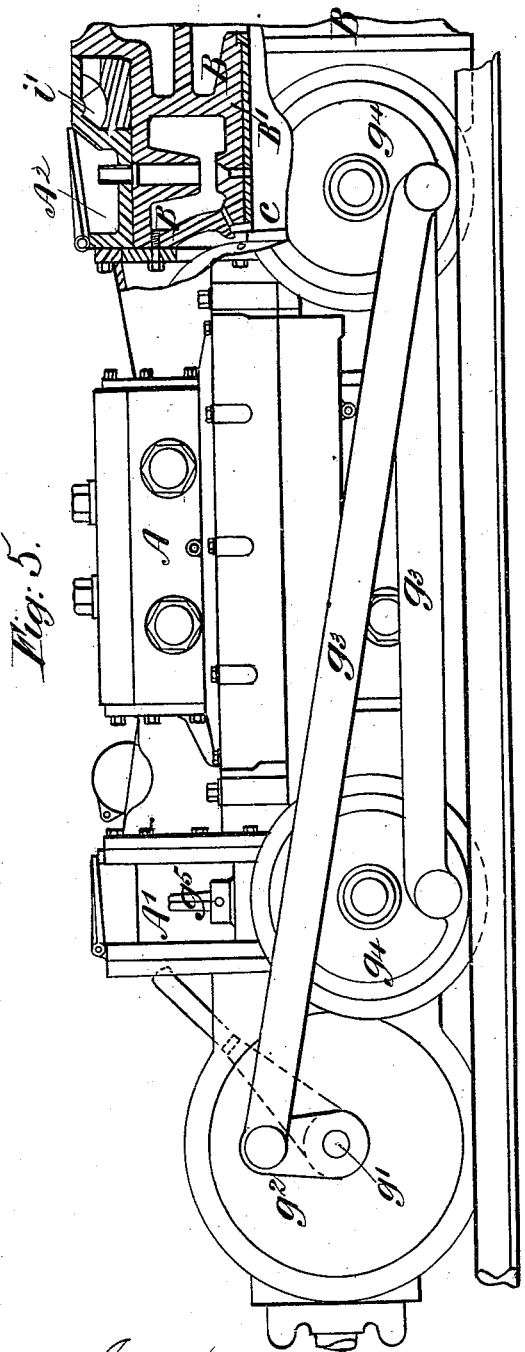
Witnesses.
Walter E. Allen.
S. Allen.
Inventor.
Frederick Hurd.
By Knight Bros
Attorneys.

(No Model.) 12 Sheets—Sheet 5.
F. HURD.
COAL CUTTING OR LIKE MACHINE.
No. 556,986. Patented Mar. 24, 1896.
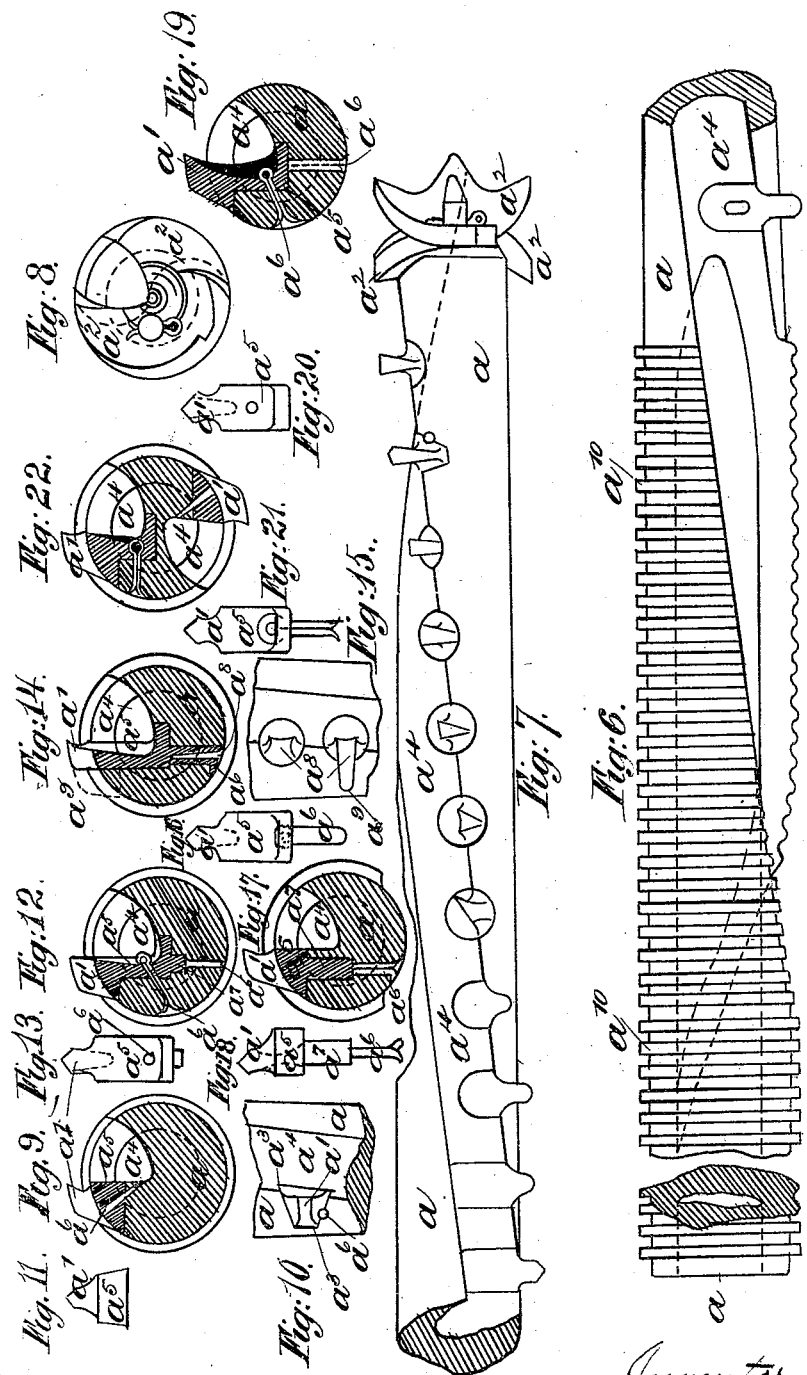

(No Model.) 12 Sheets—Sheet 6.
F. HURD.
COAL CUTTING OR LIKE MACHINE.
No. 556,986. Patented Mar. 24, 1896.
Fig. 23.
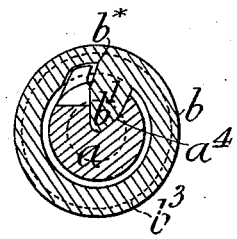
Fig. 24.
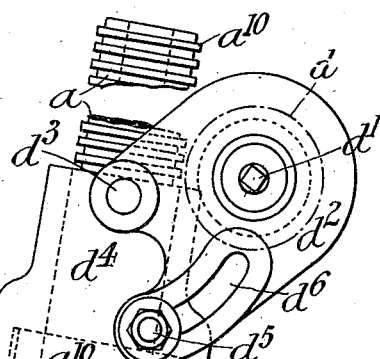
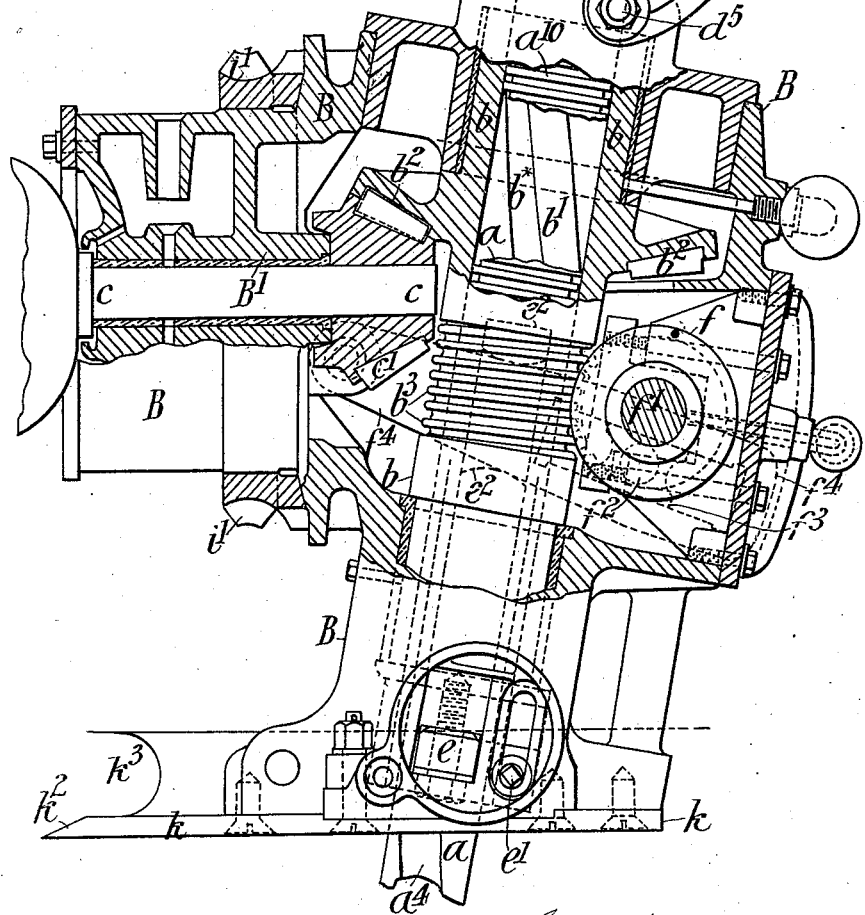
Witnesses.
Walter E. Allen.
Geo. E. Cruse.
Inventor.
Frederick Hurd.
By Knight Bros
Attorneys.

(No Model.) 12 Sheets—Sheet 7.
F. HURD.
COAL CUTTING OR LIKE MACHINE.

No. 556,986. Patented Mar. 24, 1896.

Witnesses.
Walter E. Allen.

Inventor.
Frederick Hurd.
By Knight Bros.
Attorneys.

(No Model.) 12 Sheets—Sheet 8.
F. HURD.
COAL CUTTING OR LIKE MACHINE.

No. 556,986. Patented Mar. 24, 1896.

Witnesses.
Walter E. Allen.

Inventor.
Frederick Hurd.
By Knight Bros
Attorneys.

(No Model.) 12 Sheets—Sheet 9.
F. HURD.
COAL CUTTING OR LIKE MACHINE.
No. 556,986. Patented Mar. 24, 1896.
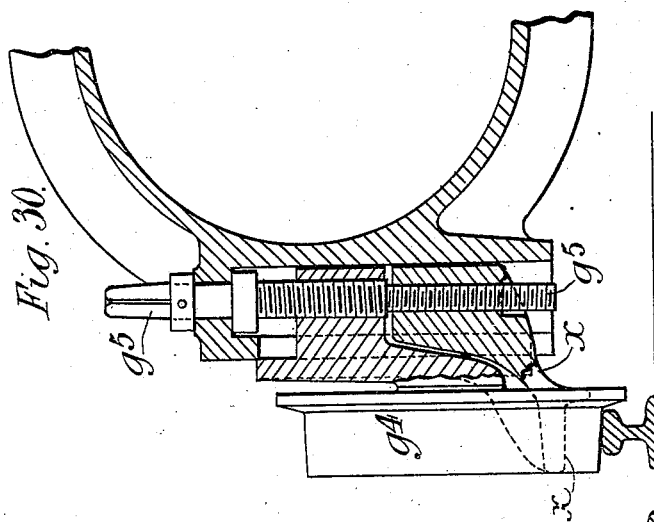
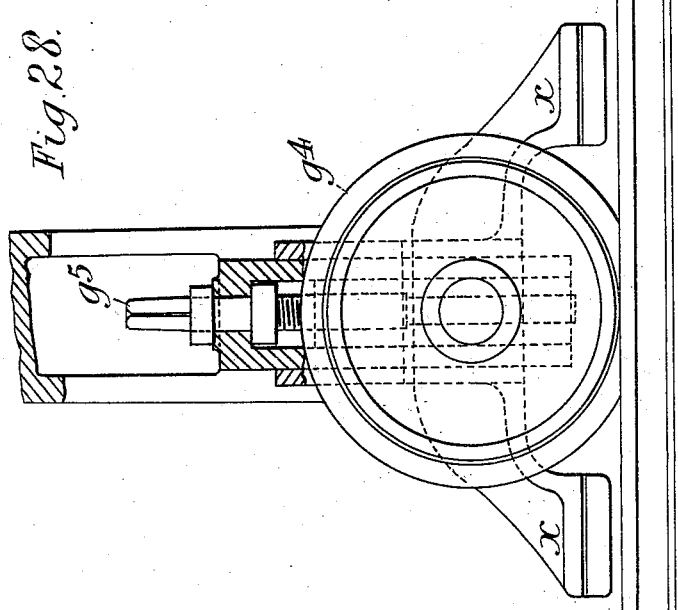
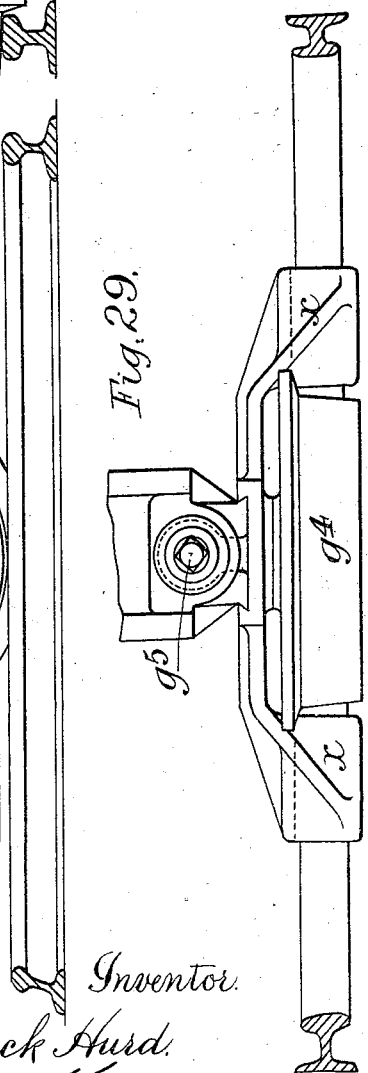
Witnesses.
Walter E. Allen.
Geo. E. Cruse.
Inventor.
Frederick Hurd.
By Knight Bros.
Attorneys.

(No Model.) 12 Sheets—Sheet 10.

F. HURD.
COAL CUTTING OR LIKE MACHINE.

No. 556,986. Patented Mar. 24, 1896.

Witnesses.
Walter E. Allen

Inventor.
Frederick Hurd.
By Knight Bro
Attorneys.

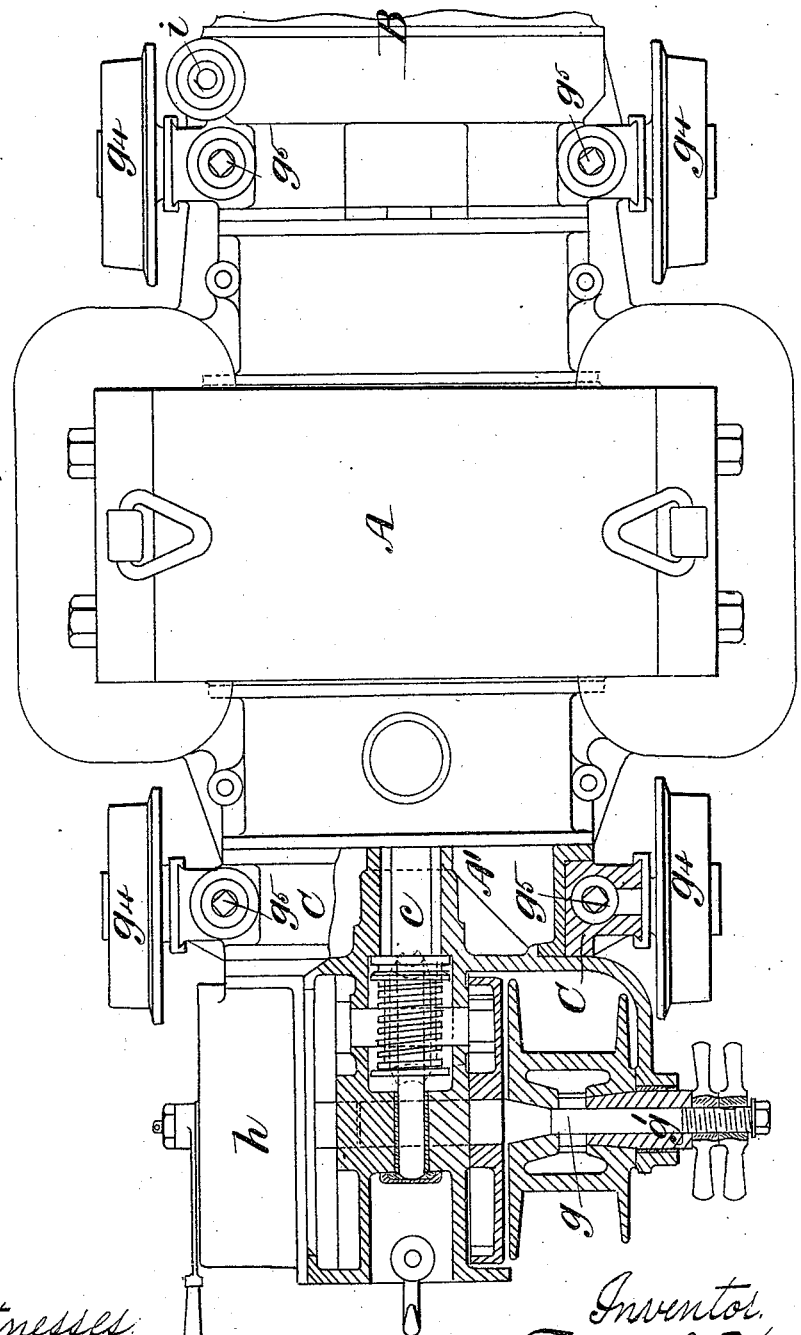

(No Model.) 12 Sheets—Sheet 12.
F. HURD.
COAL CUTTING OR LIKE MACHINE.
No. 556,986. Patented Mar. 24, 1896.
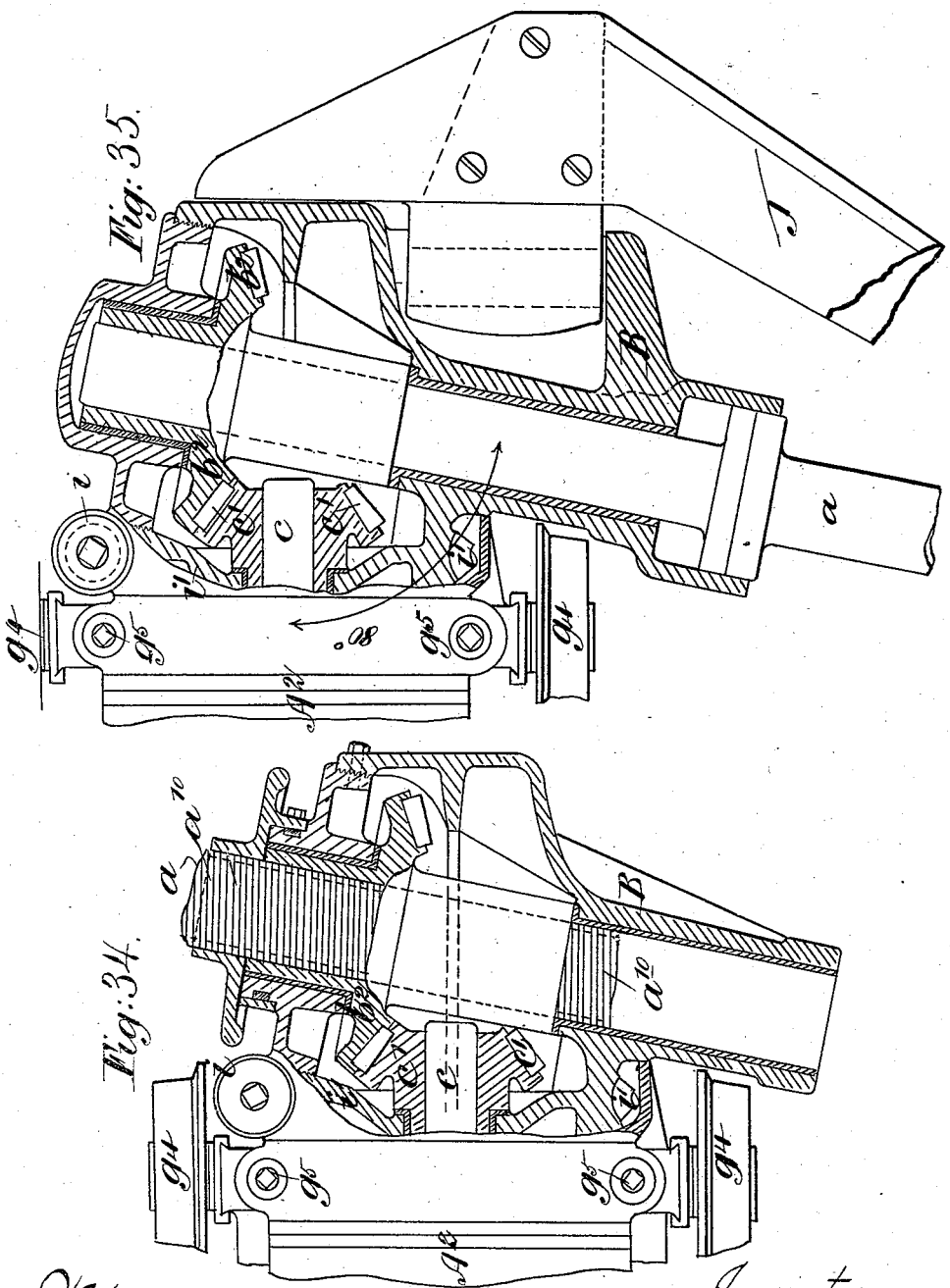
Witnesses
Walter E. Allen.
S. Allen.
Inventor.
Frederick Hurd.
By Knight Bros
Attorneys.

UNITED STATES PATENT OFFICE.

FREDERICK HURD, OF LONDON, ENGLAND.

COAL-CUTTING OR LIKE MACHINE.

SPECIFICATION forming part of Letters Patent No. 556,986, dated March 24, 1896.

Application filed August 3, 1893. Serial No. 482,308. (No model.) Patented in England August 4, 1892, No. 14,124[A]; in Belgium August 8, 1893, No. 105,926; in Germany August 8, 1893, No. 76,919; in France August 8, 1893, No. 232,025; in Victoria November 3, 1893, No. 10,937; in New South Wales November 6, 1893, No. 4,715; in Tasmania November 6, 1893, No. 1,218; in South Australia November 6, 1893, No. 2,589; in New Zealand November 11, 1893, No. 6,532; in Western Australia November 14, 1893, No. 465, and in India April 9, 1894, No. 359.

*To all whom it may concern:*

Be it known that I, FREDERICK HURD, mining, civil, and mechanical engineer, a subject of the Queen of Great Britain, residing at No. 11 Grittleton Road, London, in the county of Middlesex, England, have invented certain new and useful Improvements in and Connected with Mining-Machines, (for which I have obtained Letters Patent in England, No. 14,124[A], dated August 4, 1892; in Belgium, No. 105,926, dated August 8, 1893; in Germany, No. 76,919, dated August 8, 1893; in France, August 8, 1893, No. 232,025; in Victoria, No. 10,937, dated November 3, 1893; in New South Wales, No. 4,715, dated November 6, 1893; in Tasmania, No. 1,218, dated November 6, 1893; in South Australia, No. 2,589, dated November 6, 1893; in New Zealand, No. 6,532, dated November 11, 1893; in Western Australia, November 14, 1893, No. 465, and in India, No. 359, dated April 9, 1894,) of which the following is a specification.

My invention relates to mining machinery for undercutting, nicking on end, and other operations in connection with mining coal or other minerals. By my invention mines can be worked with less expense and greater output than can be obtained by the machines at present in use, and the disadvantages and dangers incident to those machines overcome; and my invention consists of the means and arrangement thereof, hereinafter described and specifically pointed out in the claims, for carrying out the several objects of my invention.

In order that my invention may be fully understood, I will proceed to describe the same, with reference to the accompanying drawings, in which—

Figure 26:
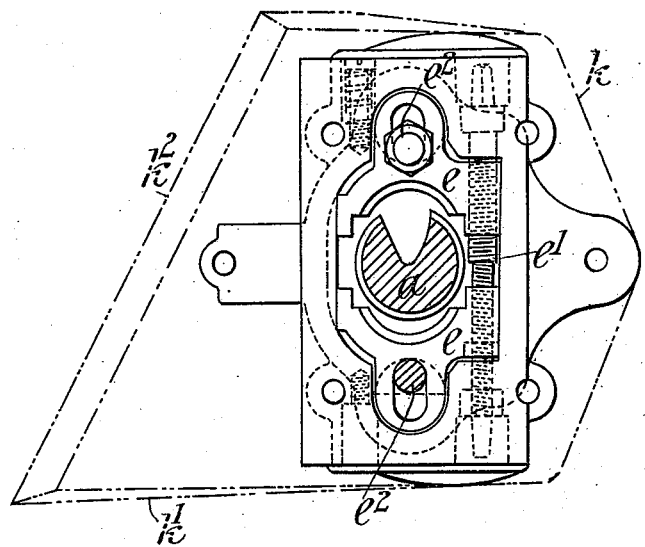
Figure 27:
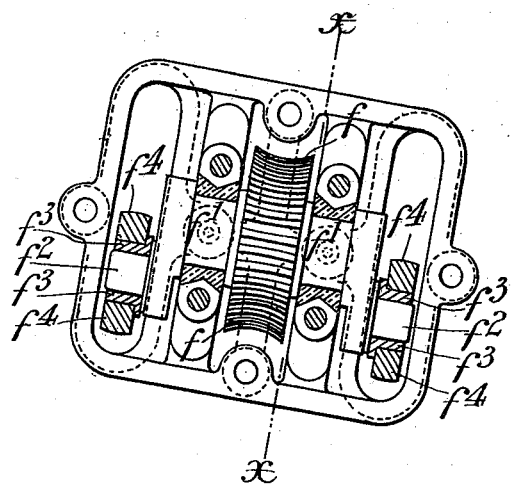
Figure 31:
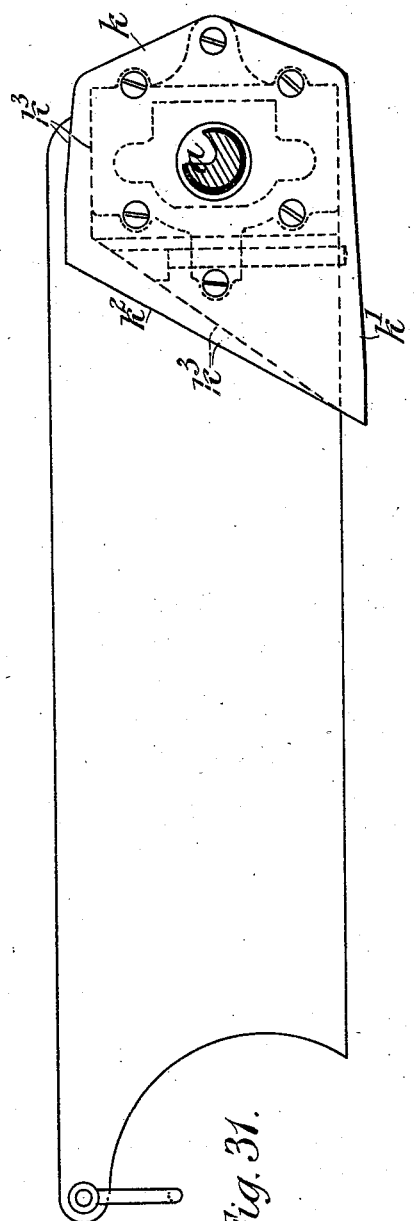
Figure 32:
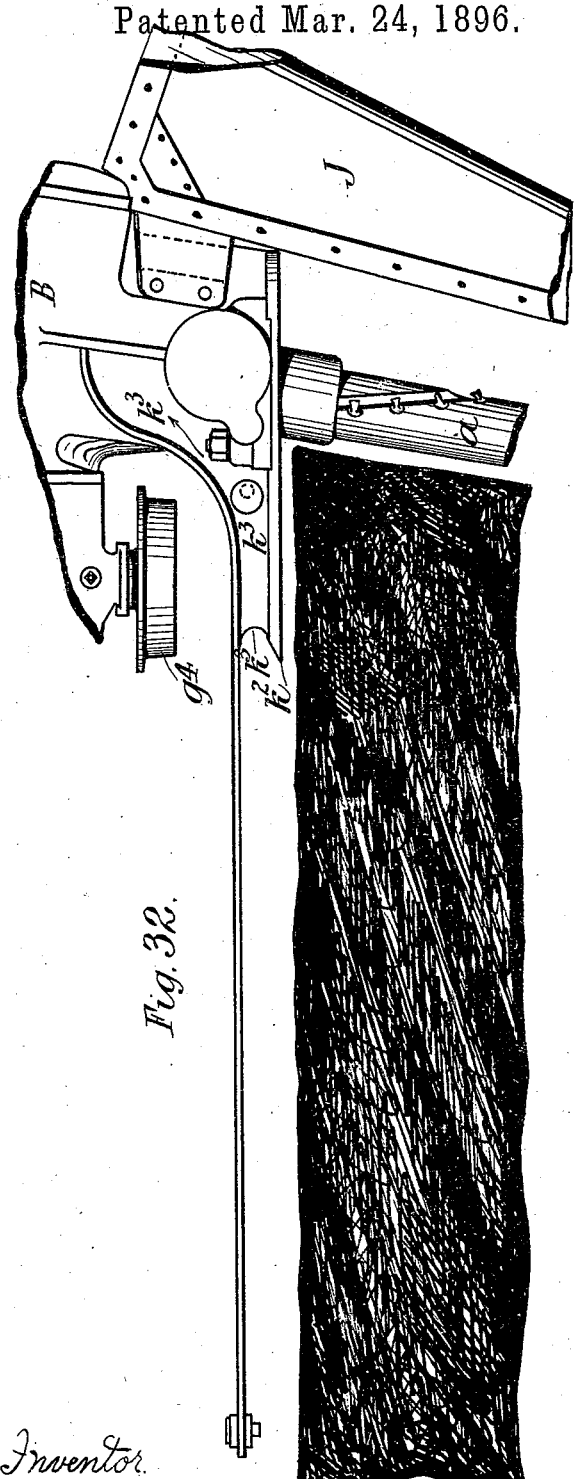

Figure 1 is a perspective view of a mining-machine embodying my improvements. Fig. 2 is a top plan view, partly in horizontal section. Fig. 3 is a top plan view of the motor. Fig. 4 is an end view thereof; and Fig. 5 is a side elevation, partly in section. Figs. 6 and 7 are respectively side views of the two ends of the cutter-bar. Fig. 8 is an end view of the cutter. Fig. 9 is a cross-section of the cutter. Fig. 10 is a detail plan showing one form of tooth on the cutter and the method of securing the same thereto. Figs. 11 to 22, inclusive, show various forms and methods of securing the teeth to the cutter-bar. Fig. 23 is a detail cross-section showing the manner of securing the cutter-bar within the casing which revolves it. Fig. 24 is an enlarged detail view, partly in section, of the means for revolving, feeding, and reciprocating the cutter-bar. The trimming or smoothing cutter is also shown in this figure. Fig. 25 is an end view of the motor and cutter, partly in cross-section, and showing the cutter secured within the casing by which it is revolved. Fig. 26 is a detail view of the thrust-blocks adapted to be secured around the cutter-bar when the latter is being reciprocated. Fig. 27 is a detail sectional view of the mechanism adapted to reciprocate the cutter-bar. Figs. 28, 29, and 30 are respectively detail side top elevations and a vertical section of the means for braking the motor on the tracks. This mechanism also serves to raise the motor and adjacent parts in order to vary the inclination of the cut. Fig. 31 is an enlarged side elevation of the smoothing or trimming cutters. Fig. 32 is a top view of the same and also showing a portion of the cutter and conveyer-chute. Fig. 33 is a top view of the motor, partly in section, and showing the mechanism for moving the machine forward or backward. Fig. 34 is a detail sectional view of the cutter-bar provided with a screw-feed, and Fig. 35 is a detail sectional view of the cutter-bar without feed-motion.

Similar letters of reference designate like parts in the several figures.

A represents the motor constructed preferably according to an application filed of even date herewith, Serial No. 482,309, and mounted upon a suitable truck traveling on tracks. The motor and truck are adapted to carry a suitable cutter-bar drill *a*, the mechanism for revolving and reciprocating and feeding it, and other parts which go to make up a complete mining-machine, all of which will be hereinafter fully referred to.

The cutter-bar drill *a*, which works at one side of the truck at an angle of about eighty degrees thereto in order to prevent as much as possible the jarring of the machine, has on its drilling end auger-cutters $a^2$, (see Figs. 7 and 8,) which are detachably secured to the cutter-bar drill by any suitable means, so that in case they are broken they may be easily replaced, and spirally arranged along the cutter and detachably secured thereto are a number of cutting-teeth, formed either of chilled steel or chilled iron. These teeth may be secured to the cutter or drill by any of the means shown in Figs. 9 to 22. According to the method shown in Figs. 9 to 11 a number of dovetail recesses $a^3$ are formed at intervals along the spiral groove $a^4$ and the shanks $a^5$ of the cutter-teeth $a'$, formed to fit the recesses. They are retained in the said recesses by means of a split pin $a^6$ fitting in a hole bored partly in the side of the shank $a^5$ and partly in the recess $a^3$. According to the method shown in Figs. 12 and 13 the shank $a^5$ extends into an opening in the drill or cutter down to a little below the bottom of the groove $a^4$, and in such cases the upper part of the shank fits in a dovetailed or other recess $a^3$ formed in the upper edge of the groove. In this form the cutter-teeth are held in position by split pins $a^6$ passing through an angular hole drilled through the shank $a^5$ and the drill $a$ and springing into a countersink. If desired, the lower end of the shank may also be formed with a projection $a^7$, which enters a corresponding opening in the drill to assist in holding the tooth from rotation in its recess. According to the method shown at Figs. 14, 15, and 16 the shank fits into an opening bored in the drill, as described with respect to Figs. 12 and 13; but it is held from rotation by a split pin or split shank $a^6$ passing into an opening in the drill $a$, one side of the said split shank being hooked to catch under the bottom of one side of the opening $a^8$. If desired, the tooth may be formed, as shown by dotted lines in Fig. 14 and full lines in Fig. 15, with a backward extension $a^9$ to give strength to the working part thereof. According to the method shown at Figs. 17 and 18 the tooth $a'$ has the shank $a^5$ fitting an annular or circular recess formed in the drill $a$. The prolongation $a^7$ fits a corresponding opening and it has a split pin or shank $a^6$ extending from its bottom end and passing through a hole formed for it in the drill $a$, as described with respect to Figs. 14, 15, and 16.

The method shown at Figs. 19, 20, and 21 is similar to that described with respect to Figs. 12 and 13, except that the prolongation $a^7$ is dispensed with and the tooth held from rotation by the rear part of the tooth entering a recess in the drill, and such tooth is held in position either by an angular split-pin $a^6$ or split pin or shank $a^6$ extending from the bottom of the cutter shank and springing into a countersink, and, if desired, the split shank $a^6$ may be eccentric to the shank $a^5$.

Fig. 22 shows the cutter-bar $a$ provided with two spiral grooves $a^4$ and fitted with cutting-teeth $a'$ of the forms shown, but which may be of any of the forms previously shown and described so far as such are suitable to the said doubly-grooved bar. The auger-cutter $a^2$ is formed, as shown, with a central cutter and with two forward and two backward acting cutters, so that the said auger shall cut both in its forward and backward motions.

The cutter-bar drill is revolved by and held within the sleeve $b$ by means of a key $b'$ cast on the said sleeve $b$ and fitting in a spiral groove $a^4$ extending the whole length of the cutter-bar. The said sleeve $b$ is also provided with rifled grooves $b^\times$ for the passage of the drill-teeth as the cutter-bar drill is fed forward in the sleeve. (See Fig. 23.) The mechanism for feeding the cutter-bar drill forward is as follows: Pivoted at $d^3$ to the upper end of the bearing-collar $d^4$ extending from the casting B, which covers the mechanism for revolving and reciprocating the cutter-bar drill, is a casting $d^2$ carrying a pinion $d$ mounted on a shaft having a square head $d'$. This pinion is adapted to be held in engagement with the rack $a^{10}$ formed on the upper end of the drill, and as the pinion $d$ is revolved by a crank fitting on the square head $d'$ the cutter-bar drill is fed forward. It will be seen from Fig. 24 that the casting $d^2$ is formed with a slot $d^6$. This is to enable the pinion to be withdrawn from engagement with the rack $a^{10}$ when the latter is being turned and reciprocated, the pinion being held in either its engaged or disengaged position by means of the bolt and nut $d^5$. If desired, however, the axis of the pinion may be provided with a ratchet and driving-pawl and thus automatically feed the cutter-bar drill forward. It will be understood that while the cutter-bar drill is being fed forward the reciprocating movement of the cutter-bar drill is stopped.

I will now proceed to describe the mechanism for imparting rotary and reciprocal movement to the cutter-bar drill, the mechanism for which, as above stated, is inclosed by the casting B. Cast integral with the sleeve $b$, which is so arranged with the casting B as to revolve freely or otherwise securely mounted thereon, is a beveled cog-wheel $b^2$. This wheel meshes with and is driven by the beveled cog-wheel $c'$ journaled on the motor-shaft $c$, which extends into the casting B. Thus it will be seen that as the sleeve $b'$ is revolved the cutter-bar drill within the sleeve is also revolved. As the cutter-bar drill is being revolved it is also reciprocated, which motion is obtained by the following means: The sleeve $b$ (see Fig. 24) has a screw-thread $b^3$ formed thereon. This screw-thread engages and drives a worm-wheel $f$, journaled on a crank-shaft $f'$ suitably located within the casting B. To the crank-pins $f^2$ of the crank-shaft $f'$ boxes $f^3$ are secured, which boxes work in slots formed in the levers $f^4$. (See Figs. 24 and 27.) These levers, which are pivoted at their free ends within the casting B, pass through openings in the inner ends of a pair of rods $e^2$, which are connected at their outer ends with a pair of thrust-blocks $e$. (See Fig. 26.) These blocks are semicylindrical in their form, (see Figs. 2 and 25,) and when they are to be tightened on the cutter or drill $a$ it is done by means of the right-and-left screws $e'$. (See Fig. 26.) It will be understood that the thrust-blocks are not made too tight around the center, owing to the rotary movement of the cutter, and they are opened out far enough, when the cutter is being fed forward, by the rack $a^{10}$ and pinion $d$ on the other end of the casing.

The operation of the above parts is as follows: After the cutter-bar drill has been adjusted to the angle at which the cut is to be made it is fed forward by the feed mechanism, which is afterward withdrawn, as explained above. The motor is then started and the cutter revolved by the same. The worm $f$ is also revolved and consequently the crank $f'$. This imparts an oscillatory movement to the rods $f^4$, which through the levers $e^2$ move the thrust-bars and inclosed cutter to and fro. Thus by this operation as fast as the mineral is cut by the rotary movement it is broken up by the reciprocating motion, as well as any projections that are in the way are broken off.

In Figs. 2, 3, 4, and 5 it will be seen that the casting B, which is separate from the casting A, is provided with a worm-wheel $i'$, which is engaged by a worm $i$. This is to turn the cutter-bar drill $a$ and adjacent parts to any desired angle, and may, if desired, turn the cutter completely over, and in this manner allow the cutter to work on either side. By this arrangement a great saving is effected in the cost of these machines, they being ordinarily constructed to work only on one side, and a second machine was required to work on the other side.

In order to hold the motor and truck steadily on the track, it being considerably jarred owing to the reciprocation of the cutter, I provide the following means: At either end of the motor and truck I provide blocks X (see Figs. 28, 29, and 30) on either side of the truck-wheels $g^4$, which are adapted to bear upon the track, they being pressed thereon by means of right-and-left screws $g^5$. Thus the wheels $g^4$ and the blocks X, which have a large bearing-surface, give the machine more stability and greater steadiness. These blocks X, together with the screws $g^5$, may be also used to vary the height of the cut. At one end of the motor I attach these blocks to a separate casting C, (see Fig. 3,) which is free to revolve or move independently of the casing A', so that the blocks, together with that part of the motor, can be adapted to any unevenness of the rails on which the machine works.

The machine is moved forward or backward, as may be desired, by means of a snatch-block and a hauling-drum $g$, mounted on an axis $g'$, passing through the axis of the switch $n$ of the motor. The rope by which the machine is moved is wound on the drum, passed around the snatch-block and then attached to a fixture on the machine, or, if desired, the rope may pass directly from the drum to a fixture. If desired, a chain-wheel and chain may be employed. A still further way of moving the machine is to provide the axis $g'$ of the drum with cranks $g^2$ and connecting these cranks with the wheels $g^4$ of the trucks by means of the rods $g^3$. The axis is driven by means of a worm $g^6$ located on the motor-shaft and driving a worm-wheel located directly beneath it and on a shaft $g^7$. (See Figs. 2 and 33.) This shaft $g^7$ carries a cog-wheel $g^8$, meshing with the internal teeth of a wheel $g^9$, rigidly secured on the shaft $g'$.

As the machine is moved forward, a cutter $k$, fixed to the side of the machine and provided with cutting-edges $k'$ and $k^2$, removes any irregularities from the bottom and sides of the surface being cut or drilled. The cutter $k$ is further provided with a groove $k^3$, which conveys the cuttings to the rear part of the machine. The cuttings are then taken up by the conveyer J located behind the cutter $k$ and the drill $a^2$. Thus it will be seen that the machine can be steadily moved forward without stoppage and the mineral being cut continuously conveyed away.

In Figs. 34 and 35 I have shown the cutter-bar drill provided respectively with a screw-feed while the drill is being rotated and the drill without any feed motion.

The operation of my machine, briefly stated, is as follows: The truck is moved to the desired point, the drill moved against the mineral to be bored and cut, and the switch $n$ turned and the motor started. The drill is continuously revolved and reciprocated as the machine is moved forward, breaking and cutting the coal which is conveyed away.

Having thus described my invention, the following is what I claim as new therein and desire to secure by Letters Patent:

1. In a mining-machine, the combination of a truck, a motor mounted on said truck, a spirally-grooved cutter-bar drill mounted in and rotated by a keyed rifle-grooved sleeve carried and revolved by the motor, substantially as set forth.

2. In a mining-machine, the combination with the motor fitted on a truck, of a spirally-grooved cutter-bar drill provided with a circular feed-rack mounted in a keyed rifle-grooved sleeve and means for imparting to it a rotating, a progressively-longitudinal, a sidewise and reciprocating movement, substantially as set forth and for the purpose stated.

3. In a mining-machine, the combination with the motor and its cutter-bar drill provided with a circular feed-rack and mounted in a sleeve, of a segmentally-slotted casting pivoted to the motor and a pinion journaled therein, and suitable means for holding the pinion either in or out of engagement with the circular feed-rack, substantially as herein set forth.

4. In a mining-machine, the combination with the motor, of a spirally-grooved cutter-bar drill mounted in a sleeve which is provided with a key fitting in said groove in the cutter-bar drill, a rifled groove or passage in the sleeve to give free passage to the cutters on the drill, and means for rotating said sleeve, substantially as shown and set forth.

5. In a mining-machine, the combination with the motor, of a rifle-grooved sleeve carried and rotated by the motor, a spirally-grooved cutter-bar drill located in and driven by said sleeve, a screw-thread formed on the sleeve, a worm mounted on a crank-axle and in engagement with the screw-thread on the sleeve, suitable means in engagement with the drill and connected with the crank-axle, whereby as the crank-axle is revolved, the drill will be reciprocated, substantially as shown and described.

6. In a mining-machine, the combination with the motor, of a rifle-grooved sleeve carried and rotated by the motor, a spirally-grooved cutter-bar drill located therein, a screw-thread on said sleeve, and means for reciprocating the cutter-bar drill by the rotation of the sleeve consisting of a pair of thrust-blocks surrounding the cutter-bar drill and adapted to be securely pressed onto or disengaged from the latter, a pair of connecting-rods slotted at one end and connected at their other to said blocks, a pair of slotted rocking levers pivoted at one end and passing through the slots in the connecting-rods, and a crank-axle to which the slotted ends of the levers are connected, and a worm in engagement with the screw-thread on the sleeve, substantially as and for the purpose set forth.

7. In a mining-machine, the combination of the motor mounted on a truck, a cutter-bar drill, suitable means carried by the motor for rotating, reciprocating and longitudinally feeding said cutter-bar drill, a trimming-cutter also carried by the motor, a groove in said cutter for conducting the cuttings to the rear of the machine, and a suitable conveyer carried by the truck and located behind the drill and trimming-cutter substantially as shown and described.

8. In a mining-machine, the combination of a suitable truck carrying a motor and a spirally-grooved cutter-bar drill adapted to be rotated and reciprocated and provided with teeth along one edge of the spiral groove formed with a shank fitting in openings in the cutter-bar drill and held therein by a split pin, such shank taking the strain of the cutter in working substantially as shown and described.

9. In a mining-machine, the combination of a motor, a cutter-bar drill formed with a spiral groove and provided with cutting-teeth along one edge of the groove, a rifle-grooved sleeve carried by the motor and formed with a tongue fitting in the spiral groove, suitable means for rotating the sleeve and suitable means for feeding the cutter-bar through the sleeve, substantially as and for the purpose set forth.

10. In a mining-machine, the combination of a motor, a rifle-grooved sleeve operated by said motor, a spirally-grooved cutter-bar drill carried by said sleeve, suitable means in connection with the drill and sleeve for reciprocating the cutter, and suitable means for feeding the drill through the sleeve, consisting of a rack on the drill and a pinion adapted to be moved into engagement therewith, substantially as shown and described.

11. In a mining-machine, the combination of a motor, a cutter-bar drill provided with a rack at one end and adapted to be rotated and reciprocated by said motor, a pivoted slotted casting and having journaled therein a pinion for engagement with the rack on the drill, and a bolt fitting in said slot for holding the casting in its adjusted position, substantially as shown and described.

12. In a mining-machine, the combination of a motor, a sleeve carried thereby and having a screw-thread formed thereon and adapted to be rotated by the motor, a cutter-bar drill carried by said sleeve, and suitable means consisting of a pair of semicylindrical thrust-blocks surrounding the drill, and connected by rods with levers operated by a crank-axle carrying a worm-wheel which is in engagement with the screw-thread on the sleeve for reciprocating the drill, substantially as shown and described.

13. In a mining-machine the combination of a motor, a sleeve provided with a screw-thread, and adapted to be driven by said motor, a cutter-bar drill located in said sleeve, and suitable means for reciprocating the drill consisting of rack-threads around the drill, a pair of thrust-blocks surrounding the drill, a pair of rods slotted at their upper ends connected with the said blocks, a pair of levers pivoted at one end on the casting carrying the drill and passing through the slots in the rods, a crank-axle connected with the free ends of the levers and a worm-wheel located on the crank-axle and in engagement with the thread on the sleeve substantially as and for the purpose set forth.

14. In a mining-machine, the combination of a truck carrying a motor, a suitable casing for said motor, a drill in said casing and adapted to be rotated and reciprocated by the motor, and suitable means for holding the truck in position consisting of blocks mounted on a separate casting which is free to revolve around a part of the casing of the motor, said blocks being adapted to be forced against the truck-support by means of screws, substantially as shown and described.

FREDERICK HURD.

Witnesses:
B. J. B. MILLS,
CLAUDE K. MILLS.